(12) United States Patent
Sakai

(10) Patent No.: US 7,092,080 B2
(45) Date of Patent: Aug. 15, 2006

(54) LIGHT INTENSITY DISTRIBUTION MEASURING METHOD AND LIGHT INTENSITY DISTRIBUTION MEASURING DEVICE

(75) Inventor: Hiroshi Sakai, Nagano (JP)

(73) Assignee: NIDEC Sankyo Corporation, Nagano (JP)

( * ) Notice: Subject to any disclaimer, the term of this patent is extended or adjusted under 35 U.S.C. 154(b) by 433 days.

(21) Appl. No.: 10/717,125

(22) Filed: Nov. 19, 2003

(65) Prior Publication Data

US 2004/0156040 A1  Aug. 12, 2004

(30) Foreign Application Priority Data

Dec. 6, 2002  (JP)  ............................. 2003-354520

(51) Int. Cl.
*G01J 1/00*  (2006.01)

(52) U.S. Cl. ..................................... 356/121

(58) Field of Classification Search ................ 356/121, 356/213; 250/217, 233

See application file for complete search history.

(56) References Cited

U.S. PATENT DOCUMENTS

| | | | | |
|---|---|---|---|---|
| 3,612,885 A | * | 10/1971 | Arnaud | 250/206 |
| 3,617,755 A | * | 11/1971 | Arnaud | 250/233 |
| 4,320,462 A | * | 3/1982 | Lund et al. | 356/121 |
| 5,214,485 A | * | 5/1993 | Sasnett et al. | 356/121 |

* cited by examiner

*Primary Examiner*—Gregory J Toetley, Jr.
*Assistant Examiner*—Isiaka O. Akanbi
(74) *Attorney, Agent, or Firm*—Reed Smith LLP

(57) ABSTRACT

A light intensity distribution measuring method for measuring the light intensity distribution of a laser beam emitted by a semiconductor laser comprises the steps of measuring light intensities at a plurality of locations in a laser beam emitted by a semiconductor laser and applying their measurement results to a t distribution function to calculate the light intensity distribution. A light intensity distribution measuring device is also described.

4 Claims, 3 Drawing Sheets

⟷ : FWHM_x measurement value
⟷ : FWHM_y measurement value

LIGHT INTENSITY DISTRIBUTION MEASURING METHOD AND LIGHT INTENSITY DISTRIBUTION MEASURING DEVICE

CROSS-REFERENCE TO RELATED APPLICATIONS

This application claims priority of Japanese Application No. 2003-354520, filed Dec. 6, 2002, the complete disclosure of which is hereby incorporated by reference.

BACKGROUND OF THE INVENTION

1. Field of the Invention

The present invention relates to a light intensity distribution measuring method for measuring the light intensity of a laser beam emitted by a semiconductor and to a light intensity distribution measuring device.

2. Description of the Related Art

To configure laser optical systems such as fiber optical systems and optical head devices which reproduce and record the information with respect to optical recording media such as CDs and DVDs, it is necessary that a light intensity distribution is formed in the 2D directions of a laser beam emitted by a semiconductor laser to calculate the efficiency in usage of the light and to calculate the size of the spot at the vicinity of the focusing point when the beam is focused by the optical system. Note that, to obtain the light intensity distribution of the laser beam flux in the 2D directions, it is necessary that the light intensities are measured at a plurality of locations in the beam and the measurement results are applied to a predetermined probability density function to calculate the light intensity distribution.

Therefore, as illustrated in FIG. 1, in a light intensity distribution measuring device for calculating the light intensity distribution of a laser beam flux in the 2D directions, a light intensity detector 12 which measures the light intensities at a plurality of locations in the laser beam emitted by a semiconductor laser 11, and a data processing device 13 which calculates the light intensity distribution based on the measurement results of the light intensity detector 12 are provided. The light intensity detector 12 has a photo detector 121 that converts the detected light intensities into electrical signals and a light shielding plate 122 having pin holes or slits that enable the photo detector 121 to detect a portion of the laser beam; when the light intensity detector 12 is rotated about the light emitting point of the semiconductor laser 11, the intensity of the laser beam which radiates at any given angle from the light emitting point can be detected.

Assuming that the laser beam obeys Gaussian distribution (normal distribution) shown in Equation (1) below, the data processing device 13 calculates the light intensity distribution by applying the measurement results obtained by the light intensity detector 12 to Gaussian distribution.

$$y = f(\chi \mid \mu, \sigma) = \frac{1}{\sigma\sqrt{2\pi}} e^{\frac{-(\chi-\mu)^2}{2\sigma^2}} \quad \text{Equation (1)}$$

Here, as shown in Equation (2) below, the light intensity distribution is expressed by the maximum intensity in the vicinity of the center of the laser beam flux, its positional coordinates ($\delta x$, $\delta y$), and the angular position (//$\theta$, $\perp\theta$) of Full Width Half Maximum (FWHM), which is one half of the maximum intensity when the light beam flux is angled from the position of the maximum intensity in the X and Y directions.

$$f(x, y) = c^{\frac{-2\cdot(x-\delta_x)^2}{(1.6986\cdot 0.5\cdot FWHM_x)^2}} \cdot c^{\frac{-2\cdot(y-\delta_y)^2}{(1.6986\cdot 0.5\cdot FWHM_y)^2}} \quad \text{Equation (2)}$$

However, when the light intensity distribution, obtained under assumption that the intensity distribution of the laser beam obeys Gaussian distribution, is compared with the actual measurement values, errors of several percentage points occur in the skirt of the intensity distribution as shown in FIG. 3. Therefore, the efficiency in usage of the laser beam or the spot size cannot be obtained accurately.

OBJECT AND SUMMARY OF THE INVENTION

Considering the above problems, the primary object of the present invention is to provide a light intensity distribution measuring method by which the light intensity distribution of the laser beam emitted by a semiconductor laser can be obtained more accurately and to provide a light intensity distribution measuring device.

To achieve the above object, the present invention is a light intensity distribution measuring method for measuring the light intensities of a laser beam emitted by a semiconductor laser, wherein the light intensities are measured at a plurality of locations in the laser beam emitted by the semiconductor laser, and their measurement results are applied to the t distribution function (Student's distribution/t distribution) expressed by Equations (3) and (4) below.

$$y = f(x \mid v) = \frac{\Gamma\left(\frac{v+1}{2}\right)}{\Gamma\left(\frac{v}{2}\right)} \frac{1}{\sqrt{v\pi}} \frac{1}{\left(1+\frac{x^2}{v}\right)^{\frac{v+1}{2}}} \quad \text{Equation (3)}$$

$$\Gamma(\alpha) = \int_0^\infty e^{-t} t^{\alpha-1} dt \quad \text{Equation (4)}$$

Also, the present invention is a light intensity distribution measuring device for measuring the light intensity distribution of a laser beam emitted by a semiconductor laser, wherein a light intensity detecting means measures the light intensities at a plurality of locations in the laser beam emitted by the semiconductor laser and a data processing means calculates the light intensity distribution by applying the measurement results obtained by the light intensity detecting means to the t distribution function expressed by the above equations.

In order to obtain the light intensity distribution of a laser beam, it is necessary that the light intensities are measured at a plurality of locations in the beam and their measurement results are applied to a predetermined probability density function. Since the t distribution function provides the results closer to the actual measurement values than Gaussian distribution does, the measurement results obtained by the light intensity detecting means are applied to the t distribution function to calculate the light intensity distribution in the present invention. Therefore, the light intensity distribution in which less error is found even at the skirt portion of the light intensity distribution can be obtained. Consequently the efficiency in usage of the laser beam or the spot size can be obtained accurately.

In the present invention, it is preferred that nonlinear least squares be used for the parameters of the t distribution function to calculate the light intensity distribution. In other words, in the light intensity distribution measuring device of the present invention, it is preferred that the data processing means use nonlinear least squares for each parameter of the t distribution function. For each parameter of the t distribution function is used the parameter that gives the least residual sum of squares of the predicted value, which is obtained from the estimated distribution, and the measurement result, which is obtained by the light intensity detecting means. In that case, in the present invention, the parameter necessary to express the light intensity distribution by the t distribution function cannot be solved analytically since the primary partial derivative contains the parameter itself when the derivative is partially-differentiated. However, the parameter of the t distribution can be obtained by using nonlinear least squares, for example, by an iterative solution such as a Newton method or its improvement.

DESCRIPTION OF THE PREFERRED EMBODIMENTS

Figure 1:
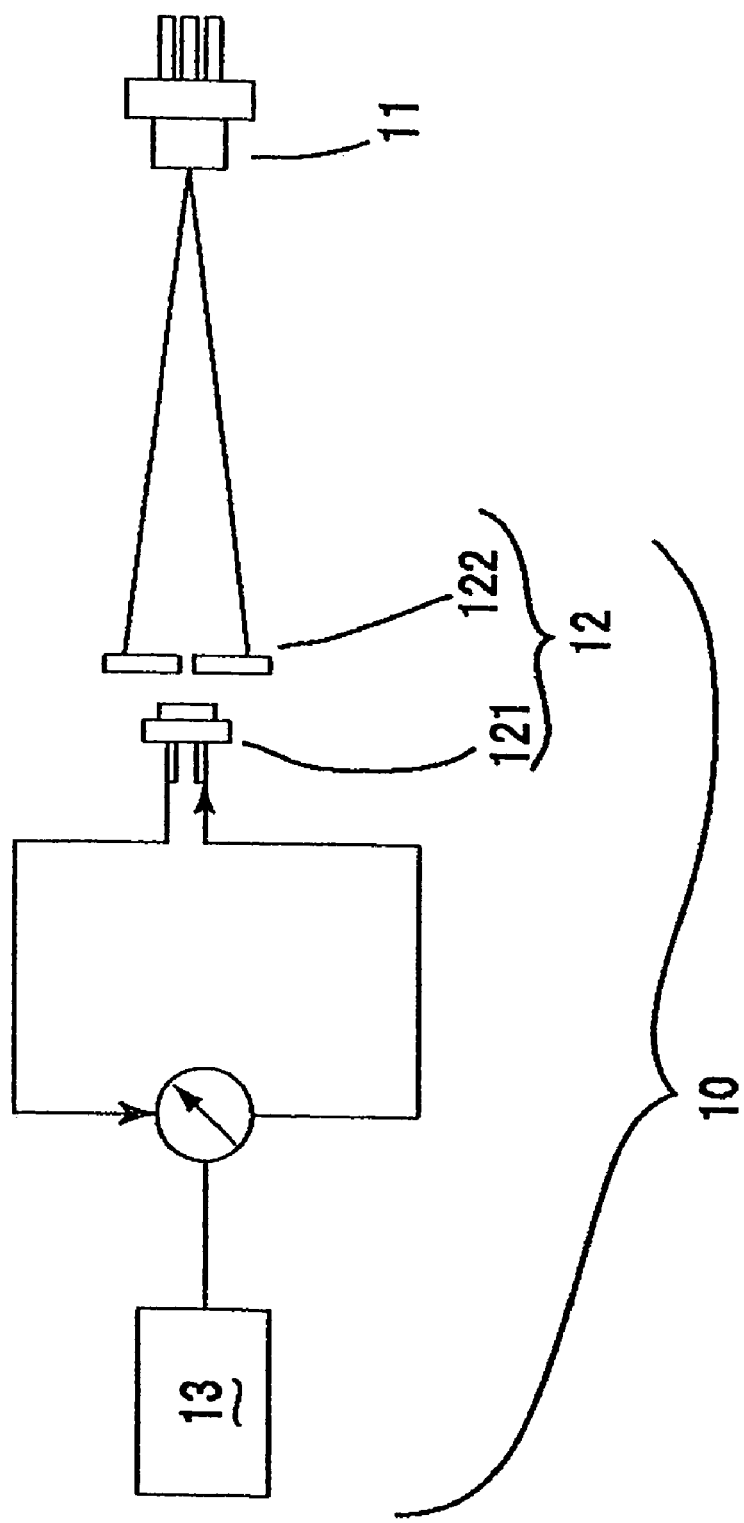
FIG. 1 is a diagram of a light intensity distribution measuring device.

The light intensity distribution measuring method and the light intensity distribution measuring device to which the present invention is applied are described referring to the drawings.

Figure 2:
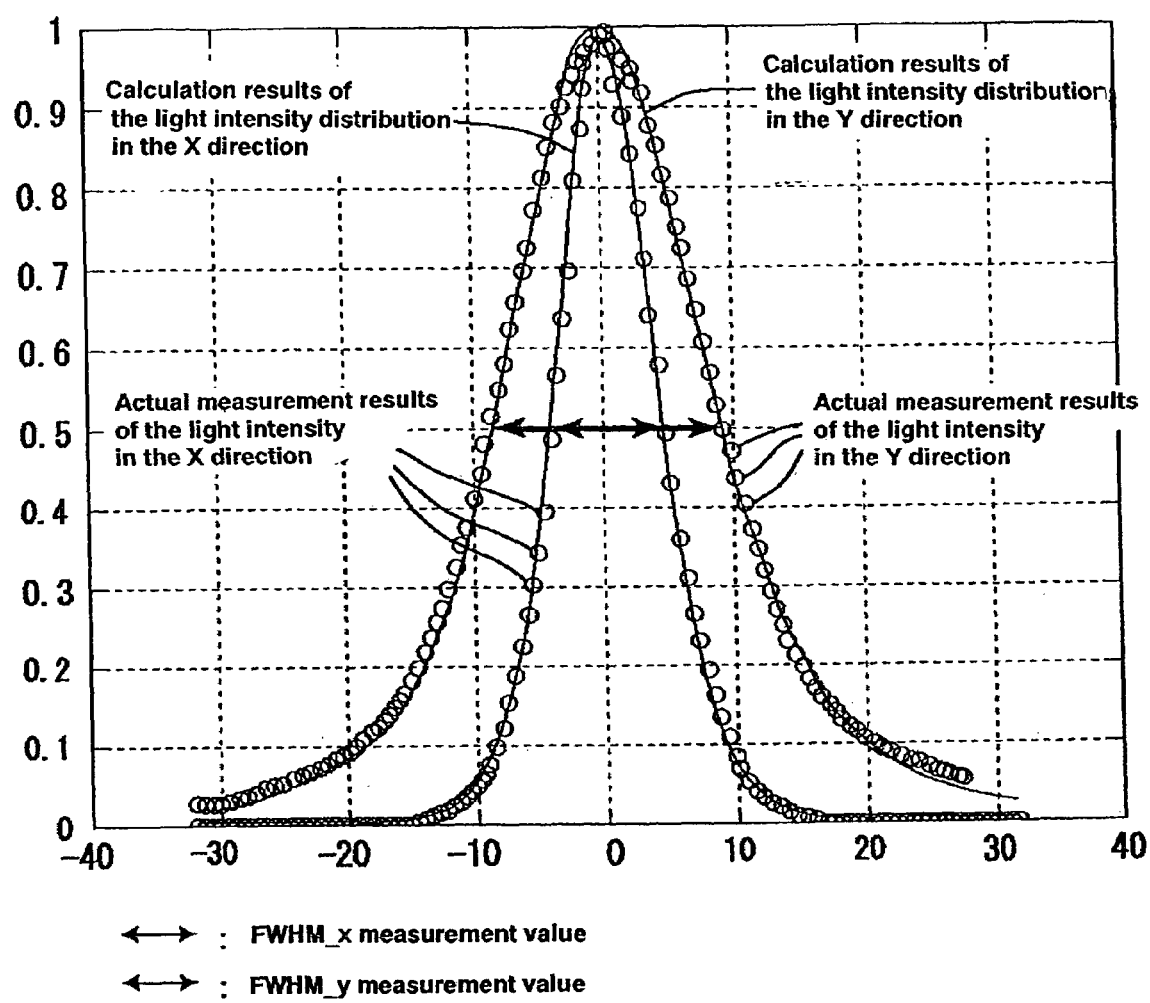
FIG. 2 is a graph showing a comparison of the light intensity distribution calculated by the method of the present invention and the actual measurement values.
Figure 3:
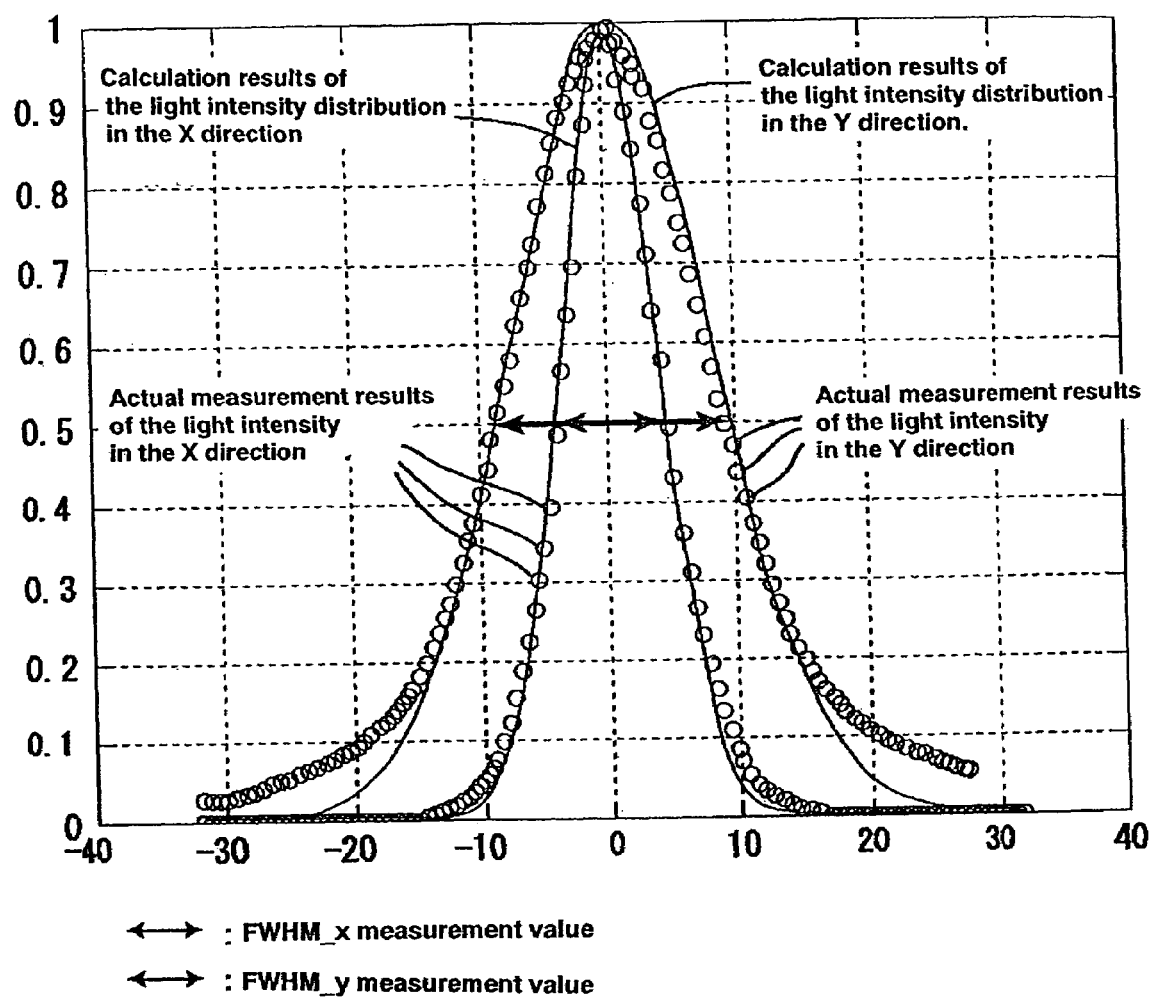
FIG. 3 is a graph showing a comparison of the light intensity distribution calculated by a conventional method and the actual measurement values.

FIG. 1 is a diagram of a light intensity distribution measuring device. FIG. 2 is a graph showing a comparison of the light intensity distribution which is calculated by the method of the present invention and the actual measurement values.

In FIG. 1, a light intensity distribution measuring device 10 is used for obtaining the light intensity of the laser beam in the 2D directions, the laser beam being emitted by a semiconductor laser 11. The device 10 has a light intensity detector 12 which measures the light intensities at a plurality of locations in the laser beam emitted by the semiconductor laser 11, and a data processing device 13 which calculates the light intensity distribution based on the measurement results which are obtained by the light intensity detector 12.

The light intensity detector 12 includes a photo detector 121 which converts the detected light intensities into electrical signals, and a light shielding plate 122 having pin holes or slits that enable the photo detector 121 to detect a portion of the laser beam; when the light intensity detector 12 is rotated about the light emitting point of the semiconductor laser 11, the intensity of the laser beam which radiates at any given angle from the light emitting point can be detected.

In this embodiment, the data processing device 13 has a micro computer which calculates the light intensity distribution in the following order of the equations and a memory in which the operation program for the micro computer is stored; assuming that the laser beam obeys the t distribution function expressed by the following equations (5) and (6), the measurement results obtained by the light intensity detector 12 are applied to the t distribution function to calculate the light intensity.

$$y = f(x|v) = \frac{\Gamma\left(\frac{v+1}{2}\right)}{\Gamma\left(\frac{v}{2}\right)} \frac{1}{\sqrt{v\pi}} \frac{1}{\left(1+\frac{x^2}{v}\right)^{\frac{v+1}{2}}}$$ Equation (5)

$$\Gamma(\alpha) = \int_0^\infty e^{-t} t^{\alpha-1} dt$$ Equation (6)

Since the light intensity distribution needs to be calculated in the 2D directions (X direction, Y direction) of the laser beam emitted by the semiconductor laser 11, Equation (5) is modified as the following equation (7) in this embodiment.

$$f(x,y) = \frac{\Gamma\left(\frac{v_x+1}{2}\right)}{\Gamma\left(\frac{v_x}{2}\right)} \frac{1}{\sqrt{v_x\pi}} \frac{1}{\left(1+\frac{x^2}{v_x}\right)^{\frac{v_x+1}{2}}} \frac{\Gamma\left(\frac{v_y+1}{2}\right)}{\Gamma\left(\frac{v_y}{2}\right)} \frac{1}{\sqrt{v_y\pi}} \frac{1}{\left(1+\frac{y^2}{v_y}\right)^{\frac{v_y+1}{2}}}$$ Equation (7)

Note that, when the degrees of freedom (measurement points) are expressed by (nx, ny) in Equation (7) above, vx=nx−1 and vy=ny−1.

When the X component and the Y component of the above equation are respectively expressed in the following equations (8) and (9), Equation (7) is expressed as Equation (10).

X component $\frac{\tau\left(\frac{v_x+1}{2}\right)}{\tau\left(\frac{v_x}{2}\right)} \frac{1}{\sqrt{v_x\pi}} \frac{1}{\left(1+\frac{x^2}{v_x}\right)^{\frac{v_x+1}{2}}} =$ Equation (8)

$TPDF_x(x, v_x)$

Y component $\frac{\tau\left(\frac{v_y+1}{2}\right)}{\tau\left(\frac{v_y}{2}\right)} \frac{1}{\sqrt{v_y\pi}} \frac{1}{\left(1+\frac{y^2}{v_y}\right)^{\frac{v_y+1}{2}}} =$ Equation (9)

$TDPF_y(y, v_y)$ $f(x,y) = TPDF_x(x,v) \cdot TPDF_y(y,v_y)$ Equation (10)

In order to express the deviation from the center of the maximum intensity of the laser beam, the offset values, δx and δy, are assigned respectively to x and y as shown by the following equation (11).

$f(x,y) = TPDF_x(x-\delta_x, v_x) \cdot TPDF_y(y-\delta_y, v_y)$ EQUATION 11

Normally, the maximum intensity is normalized to 1. Therefore, the right side of Equation (11) is divided by the maximum value of TPDF to normalize the maximum intensity, as shown by Equation (12).

$$f(x, y) = \frac{TPDF_x(x - \delta_x, v_x)}{TPDF_x(x_0, v_x)} \cdot \frac{TPDF_y(y - \delta_y, v_y)}{TPDF_y(y_0, v_y)} \quad \text{Equation (12)}$$

Further, the coefficient that determines the angle of divergence of the laser beam can be expressed by attaching the coefficient, αx, αy, to each variable, x, y in Equation (12), as shown by Equation (13).

$$f(x, y) = \frac{TPDF_x(\alpha_x \cdot x - \delta_x, v_x)}{TPDF_x(x_0, v_x)} \cdot \frac{TPDF_y(\alpha_y \cdot y - \delta_y, v_y)}{TPDF_y(y_0, v_y)} \quad \text{Equation (13)}$$

The above equation can express the light intensities of the flux of the laser beam in the 2D direction.

Each parameter, δx, δy, vx, vy, αx, αy needs to be calculated in the above equation. In this embodiment, nonlinear least squares are used for each parameter of the t distribution function. In other words, the parameter that gives the least residual sum of squares of the predicted value, which is obtained from the estimated distribution, and the measurement results, which are obtained by the light intensity detecting means, is given. In that case, the parameter necessary to express the light intensity distribution by the t distribution function cannot be solved analytically since the primary partial derivative contains the parameter itself when the derivative is partially-differentiated. However, the parameter of the t distribution can be obtained by using nonlinear least squares, for example, by an iterative solution such as a Newton method or its improvement. The method of nonlinear least squares is described in detail in "Nonlinear Least Squares," by Dennis J. E., Jr., State of the Art in numerical Analysis ed. D. Jacobs, Academic Press, pp. 269–312, 1977.

In the above manner, the measurement results of the light intensities at a plurality of locations are applied to the t distribution probability density function to calculate the light intensity distribution in the X direction and the Y direction; when the calculation results and the actual measurement values are compared, the light intensity distribution in which less error is found even at the skirt portion of the distribution can be obtained, as shown in FIG. 2. Therefore, the efficiency in usage of the laser beam or the spot size can be obtained accurately.

As described above, in the present invention, the light intensities at a plurality of locations in the laser beam emitted by the semiconductor laser are measured and the measurement results are applied to the t distribution function to calculate the light intensity distribution. Consequently the light intensity distribution in which less error is found even at the skirt portion of the light intensity distribution can be obtained. Therefore, the efficiency in usage of the laser beam or the spot size can be obtained accurately.

While the foregoing description and drawings represent the present invention, it will be obvious to those skilled in the art that various changes may be made therein without departing from the true spirit and scope of the present invention.

What is claimed is:

1. A light intensity distribution measuring method for measuring the light intensity distribution of a laser beam emitted by a semiconductor laser, comprising the steps of:
    measuring light intensities at a plurality of locations in a laser beam emitted by a semiconductor laser; and
    applying their measurement results to a t distribution function to calculate the light intensity distribution.

2. The light intensity distribution measuring method as set forth in claim 1, including the step of using nonlinear least squares for parameters of the t distribution function when said light intensity distribution is calculated.

3. A light intensity distribution measuring device for measuring the light intensity distribution of a laser beam emitted by a semiconductor laser, comprising:
    a light intensity detecting means that measures light intensities at a plurality of locations in a laser beam emitted by a semiconductor laser; and
    data processing means for calculating the light intensity distribution by applying the measurement results obtained by said light intensity detecting means to a t distribution function.

4. The light intensity distribution measuring device as set forth in claim 3, wherein said data processing means uses nonlinear least squares for parameters of the t distribution function.

* * * * *